Oct. 15, 1968 J. R. McEOWEN 3,406,260

INTERCOM SYSTEM WITH SEPARATE SIGNAL, RINGING, AND TALKING LINKS

Filed July 20, 1965 6 Sheets-Sheet 1

INVENTOR
J. R. MC EOWEN
BY M J Raskman
ATTORNEY 3,406,260

INTERCOM SYSTEM WITH SEPARATE SIGNAL, RINGING, AND TALKING LINKS

James R. McEowen, Madison Township, Middlesex County, N.J., assignor to Bell Telephone Laboratories, Incorporated, New York, N.Y., a corporation of New York Filed July 20, 1965, Ser. No. 473,381
14 Claims. (Cl. 179—37)

ABSTRACT OF THE DISCLOSURE

An intercom system is disclosed having eight talking links, two ringing links and a signal link. All calls are first established on the signal link, thereafter being transferred to one of the two ringing links for the ringing and ringback functions, and thereafter being transferred to an idle one of the eight talking links. A crossbar switch provides the crosspoints for connection of the stations to the ringing and talking links, six crosspoints being utilized for each ringing link to provide the necessary supervisory signals. Any station may transfer to the signaling link during a connection in order to add other stations for a conference connection by manual operation of a conference pushbutton. If the connection to the third station is not completed, a second operation of the conference pushbutton causes the transfer of the original parties from the ringing link back to a talking link.

Figure 1:
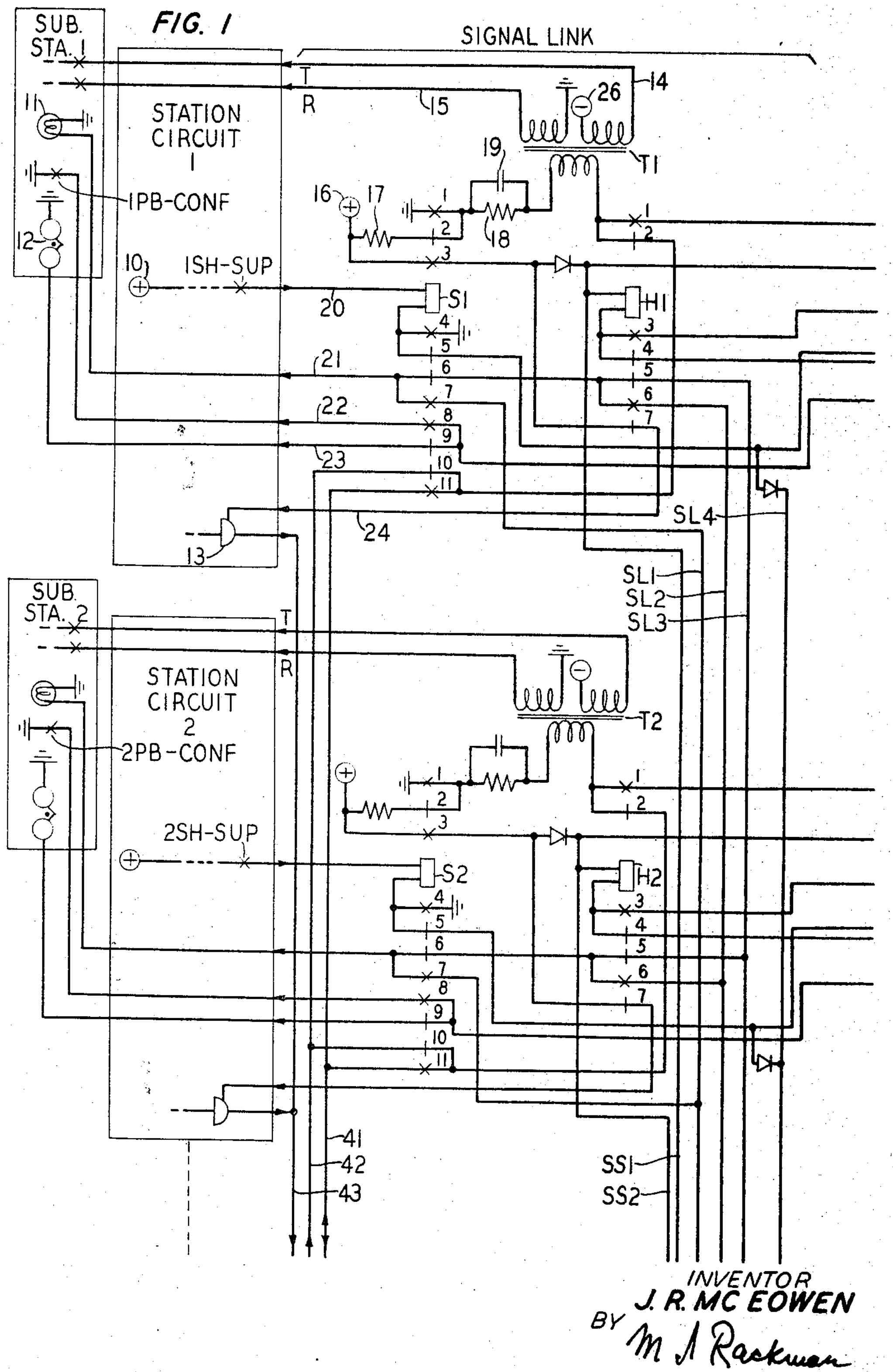
Figure 2:
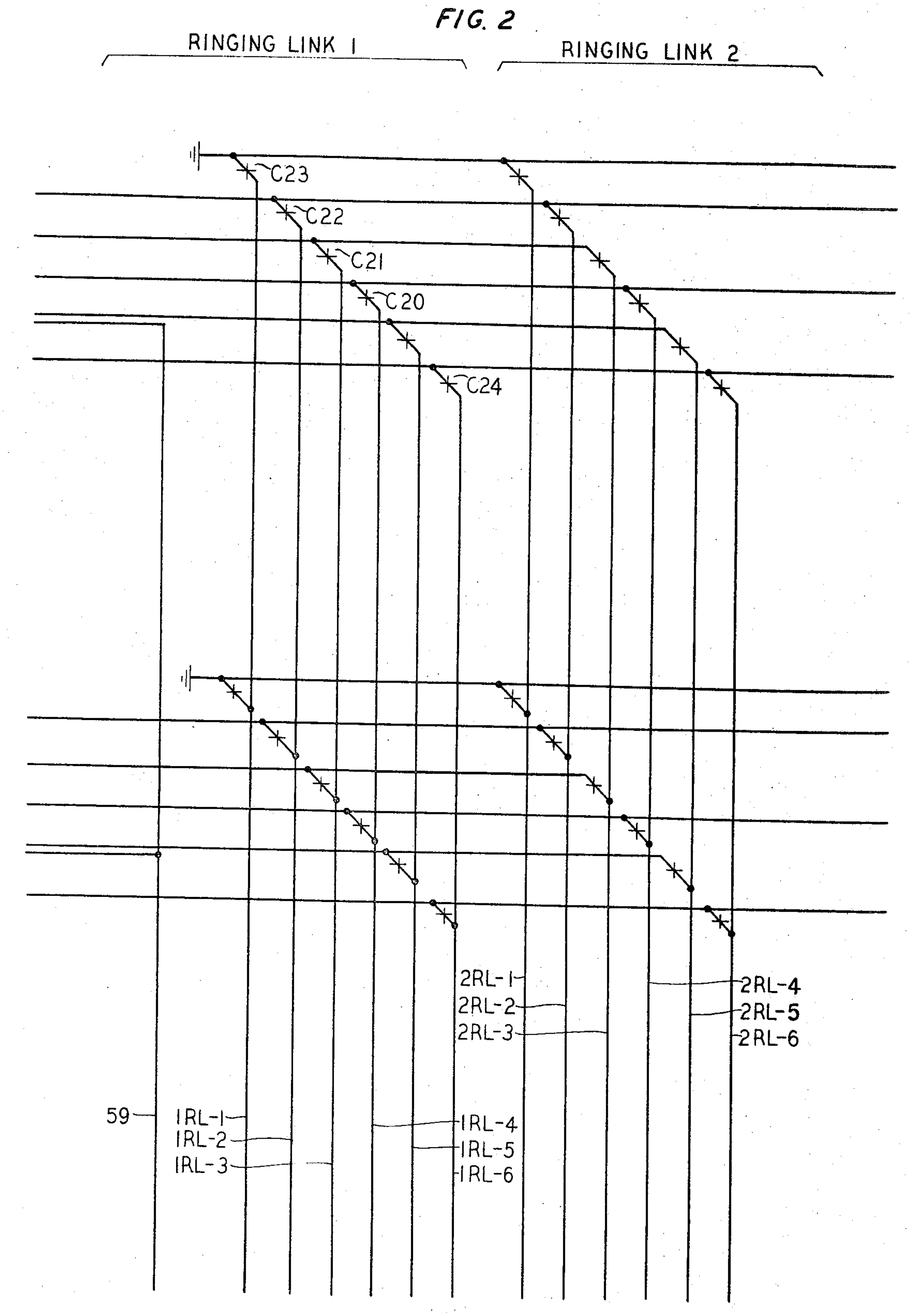
Figure 3:
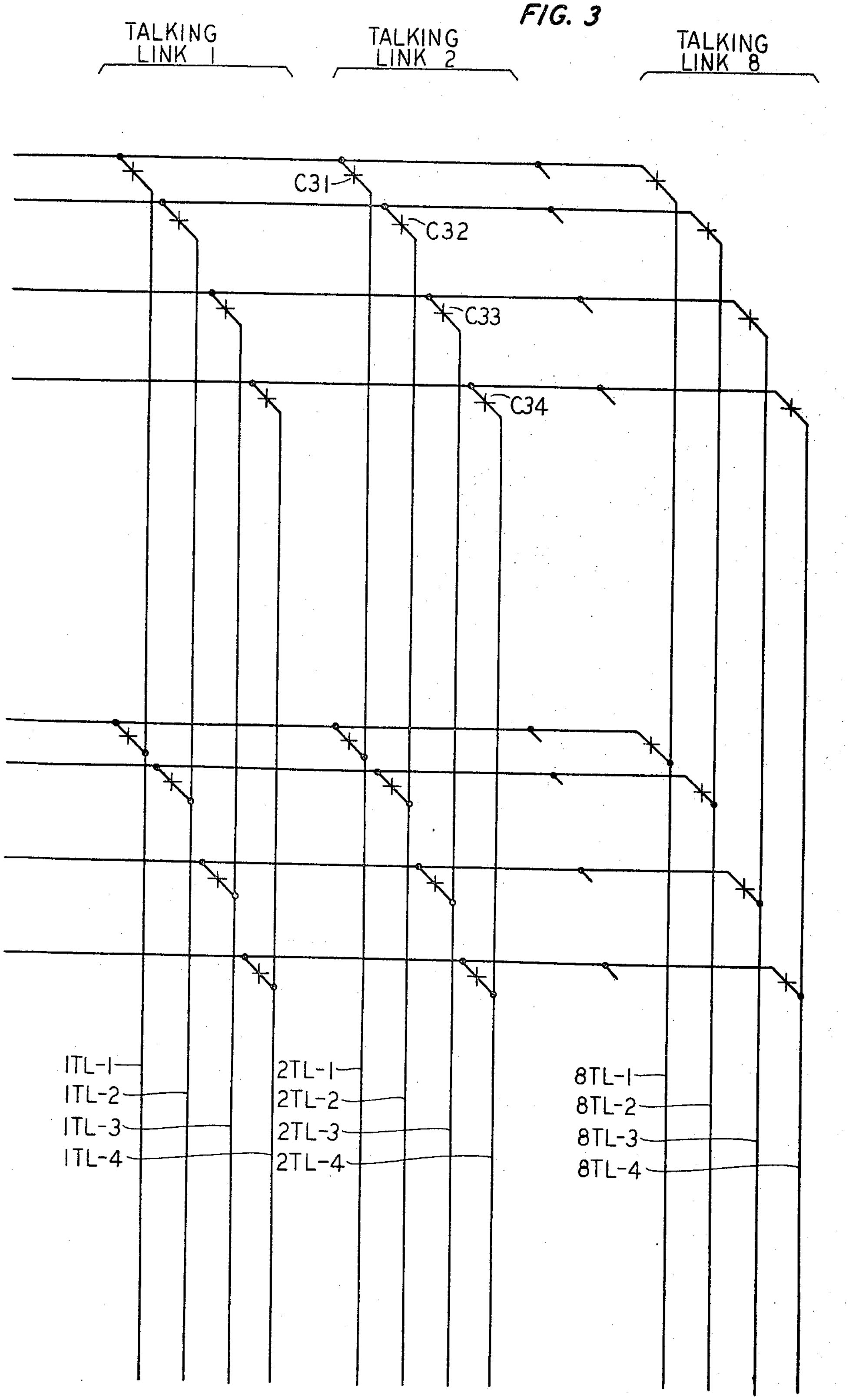

This invention relates to communications systems and more particularly to intercom systems.

In the copending application of R. E. Barbato et al., Ser. No. 363,449, filed Apr. 29, 1964, now Patent No. 3,342,944, issued Sept. 19, 1967, there is disclosed a minimally complex and highly flexible intercom system. In this system a single signal link and a group of talking links are provided. When any intercom station goes off-hook to originate a call it is connected to the signal link. The call is established over the signal link with the calling and called stations both being connected to the link. After the call is established an allotter selects an idle talking link and transfers the stations from the signal link to the talking link. The major advantage of this scheme is that the same logic circuitry is used on each call since all calls are established over the signal link, and the supervision circuits associated with the more numerous talking links may be of minimal complexity.

One of the primary advantages of the Barbato et al. system is that a relatively inexpensive design may be achieved because most of the logic circuitry in the control is associated with the single signal link and need not be duplicated. However, there is one disadvantage in this scheme. Because the signal link is used in establishing every call, while one call is being processed another call may not be handled. Before service is provided to a station going off-hook a call already being processed must be established. Accordingly, a station going off-hook may encounter a delay before any action occurs. The situation is aggravated during periods of peak use.

It is a primary object of this invention is provide an improved relatively inexpensive intercom system in which the delay encountered by a station going off-hook to originate a service request before the call is processed is reduced.

In the Barbato et al. system the signal link is used in establishing a call for a variety of functions. The calling station transmits dial pulses while on the signal link and a selector mechanism identifies the called station. A ringing signal is sent to this station over the signal link while a ringback signal is sent to the calling station. Only after the called station has gone off-hook to answer the ringing (or the ringing is manually "dumped" by one of the stations in a conference call already on the signal link) are the stations transferred from the signal link to an idle talking link. The signal link is thus tied up not only for the time interval required for the calling station to dial, but in addition during the entire ringing period. This latter period may be quite long especially if a called station does not answer the ringing immediately.

In accordance with the principles of my invention one or more ringing links are provided in addition to the signal link and the group of talking links. In the illustrative embodiment of the invention two such ringing links are provided. Again, any station going off-hook to originate a call is connected to the signal link. The station remains connected to the signal link during the dialing interval until the selector mechanism identifies the called station. Once the called station is identified the calling and called stations are connected to one of the ringing links. While connected to the ringing link a ringing signal is sent to the called station and a ringback signal is sent to the calling station. When the called station goes off-hook to answer the ringing both stations are transferred from the ringing link to an idle talking link. While the stations are on the ringing link the signal link is free and can be seized by another station originating a service request. This other station may dial a called station number and once the selector mechanism identifies the station the second pair of stations may be transferred to the other ringing link to receive ringing and ringback. This pair of stations is similarly transferred to an idle talking link when the called station goes off-hook. (With both ringing links in use the signal link will not handle a third call since there is no ringing link to which a third pair of stations may be transferred. However additional ringing links may be provided if required for systems of large capacity.) The major advantage of my invention is that while the logic circuitry for establishing a call is required for only one signal link, by including a group of ringing links in the system to provide the ringing and ringback functions the single signal link is tied up for a much shorter time interval for each call which is processed.

It is a feature of this invention to provide a plurality of talking links, a lesser plurality of ringing links, and a still lesser plurality of signal links, with all calls first being established over a signal link, thereafter being transferred to a ringing link for the ringing and ringback functions, and thereafter being transferred to an available talking link.

Figures 6, 7:
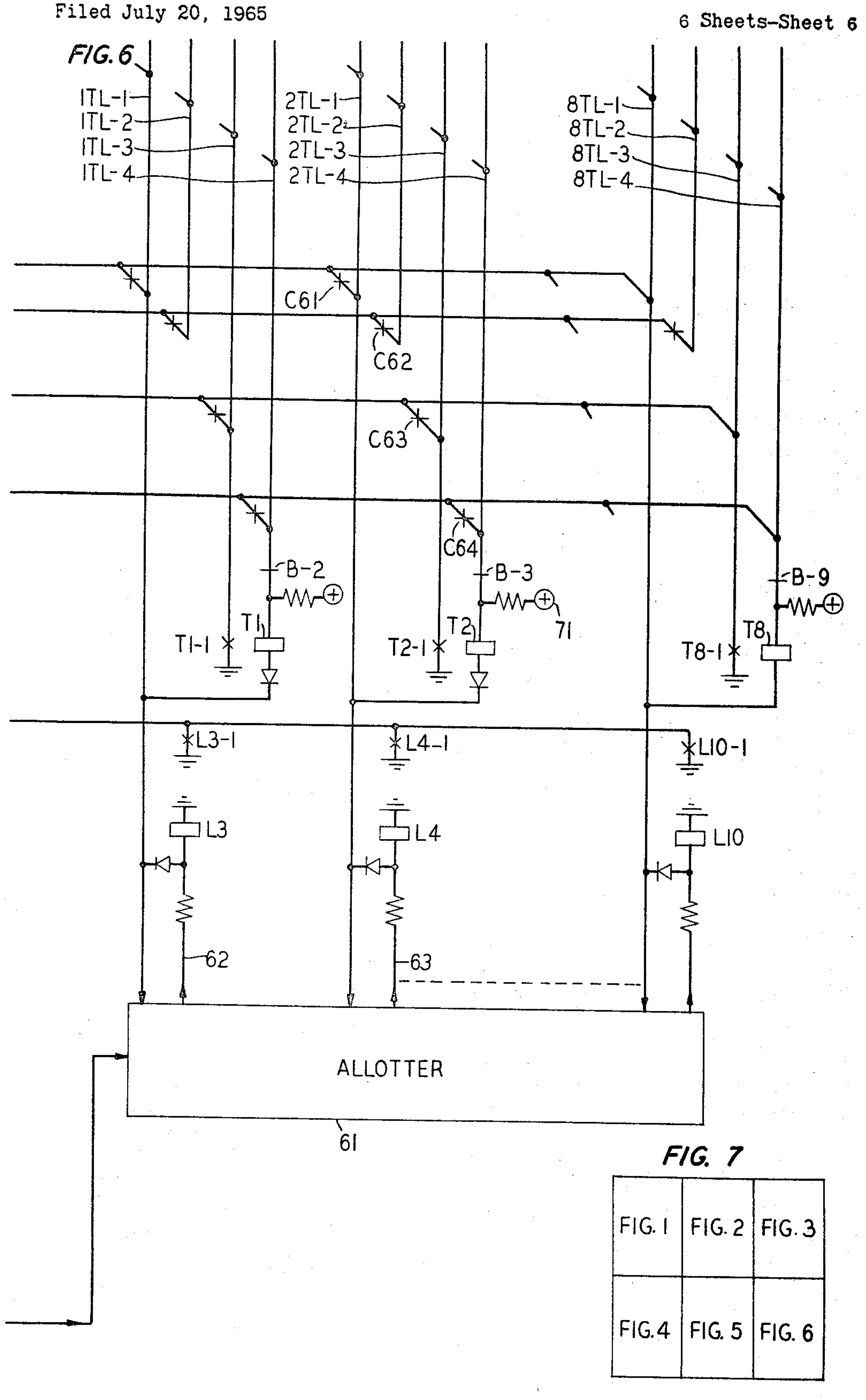

Further objects, features and advantages of the invention will become apparent upon consideration of the following detailed description in conjunction with the drawing in which:

FIGS. 1–6 are a schematic representation of an illustrative embodiment of my invention; and FIG. 7 shows the arrangement of FIGS. 1–6.

In the drawing certain circuits are shown in block diagram form only. These circuits are similar in operation to equivalent circuits shown in the above-identified Barbato et al. application. The detailed circuitry for accomplishing the functions ascribed to the various blocks of equipment will be apparent to those skilled in the art, especially in view of the Barbato et al. disclosure.

In the illustrative embodiment of the invention a crossbar switch is utilized for establishing connections over the two ringing links and the eight talking links. The switch includes ten "verticals" and 20 "horizontals," each horizontal serving a different station. The switch includes six crosspoints at the intersection of each vertical and each horizontal, although only four of each six crosspoints are used on the eight verticals which serve as the talking links. Each vertical or link is provided with one of the select magnets L1 through L10. Each horizontal is provided with one of the hold magnets H1 through H20. The six crosspoints in any set are closed by first energizing the respective select magnet and then energizing the respective hold magnet. The select magnet may then be released but the crosspoints remain closed as long as the hold magnet is energized. The crosspoints release only when the hold magnet is de-energized.

Many of the features described in the Barbato et al. application are not provided in the intercom system shown on FIGS. 1–6. These features have been omitted in order to more clearly illustrate the features of the present invention. It will be obvious to those skilled in the art how the additional features in the Barbato et al, intercom system may be incorporated in the system of FIGS. 1–6.

The operation of the intercom system may be best understood by considering the manner in which a call is established. Assume that station 1 goes off-hook to originate a call. The subset at the caller's premises includes five conductors 14, 15, 21, 22 and 23. The tip and ring conductors 14 and 15 are those used for talking and dialing purposes. A signal transmitted over conductor 21 operates lamp 11 and a ringing signal transmitted over conductor 23 operates ringer 12. When pushbutton 1PB–CONF is operated a ground signal is transmitted over conductor 22 for controlling the establishment of a conference call as will be described below. The five conductors from the subset are connected through station circuit 1 to the signal link. The tip and ring conductors 14 and 15 are connected within the station circuit to various elements not shown in the drawing. These elements control two functions. First, dial pulses transmitted over the tip and ring conductors from the telephone set are transmitted through gate 13, when the gate is enabled, to conductor 43. Second, as long as the station is off-hook contacts 1SH–SUP are closed to extend the potential of source 10 to the winding of relay S1. These contacts remain closed even during the dialing interval and open only when the station goes on-hook.

Figure 4:
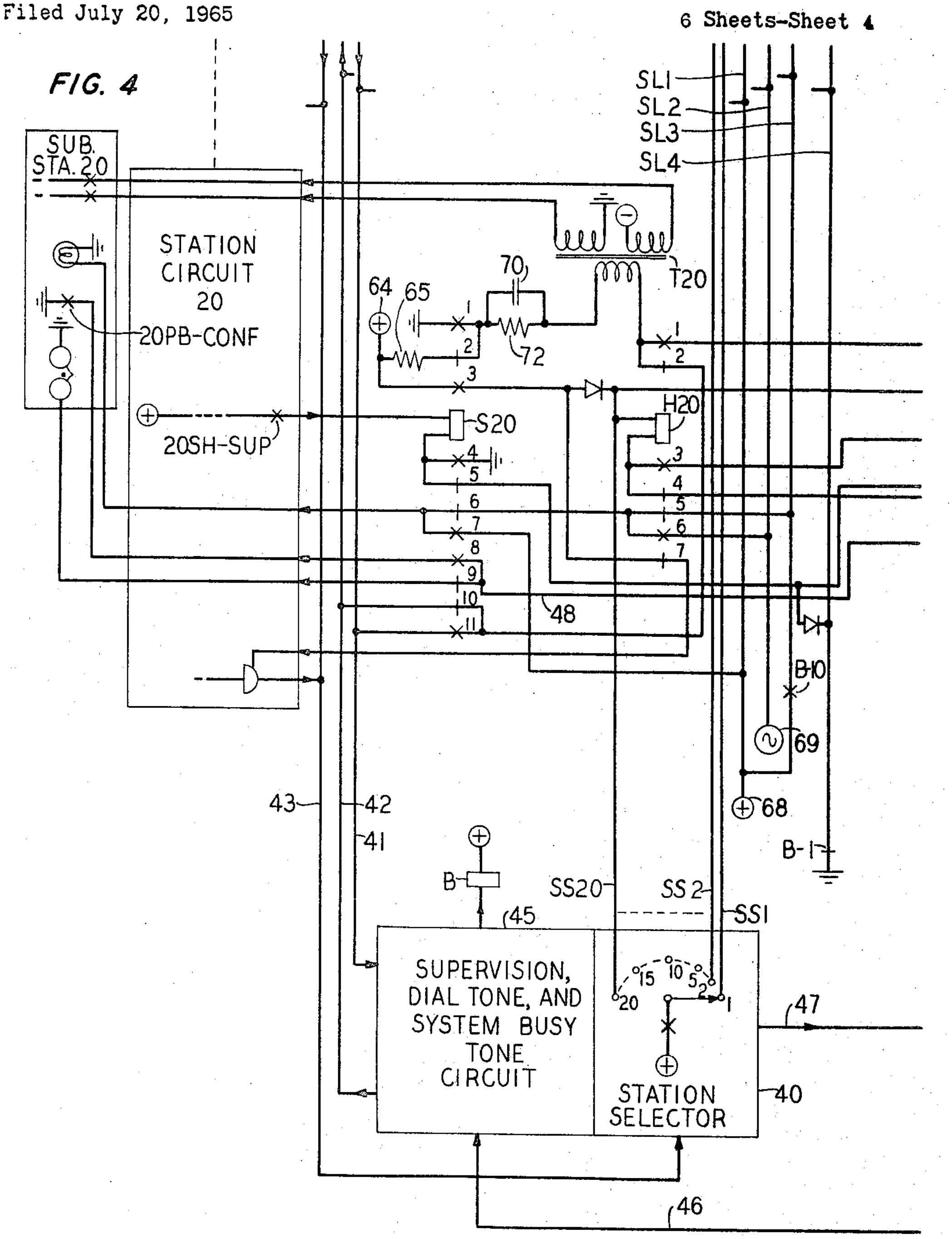
Figure 5:
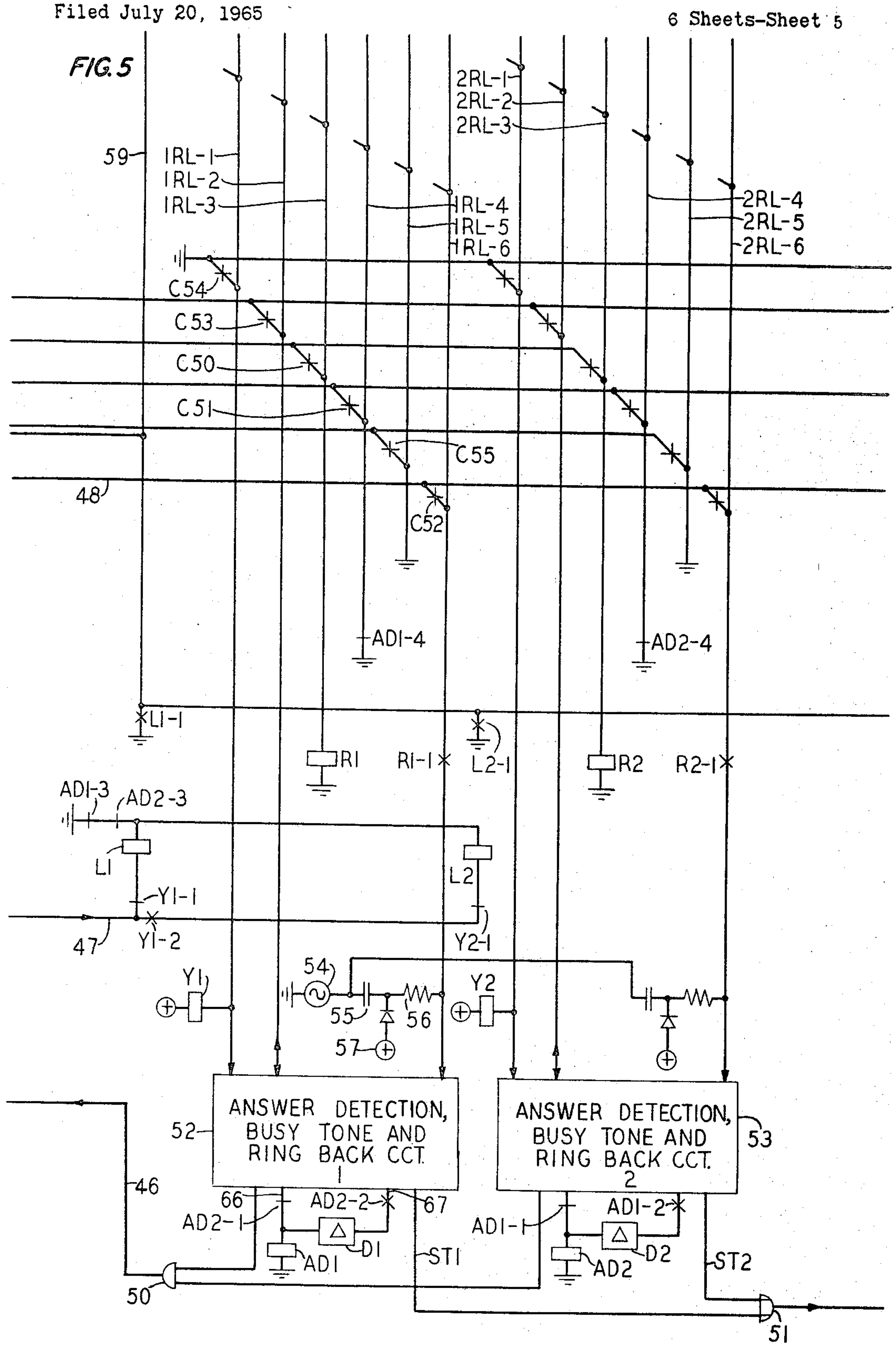

When the station first goes off-hook direct current flows between source 26 and ground through the primary windings of transformer T1 and the tip and ring conductors. The current in conductors 14 and 15 cause contacts 1SH–SUP to close. Current flows from source 10 in station circuit 1 through these contacts, the winding of relay S1, contacts S1–5, conductor SL4 and contacts B–1 to ground. The B relay on FIG. 4 is energized by circuit 45 only if the signal link is already in use, and consequently if the signal link is available contacts B–1 are closed and relay S1 is energized. If the signal link is already in use contacts B–1 are open and relay S1 cannot operate. Supervision, dial tone, and system busy tone circuit 45 supplies system busy tone to conductor 42 when the signal link is in use. The system busy tone current flows through conductor 42, contacts S1–10, contacts H1–2, the secondary winding of transformer T1, the parallel combination of resistor 18 and capacitor 19, contacts S1–2 and resistor 17 to source 16. Thus if the signal link is already in use when station 1 goes off-hook the calling party receives system busy tone and is notified that his call may not be processed at the present time. If, on the other hand, the signal link is available, busy tone is not applied to conductor 42 and contacts B–1 are closed. Relay S1 is energized and locks to ground over contacts S1–4. With contacts S1–1 closed, ground potential is extended through these contacts, resistor 18, the secondary winding of transformer T1, and contacts H1–2 and S1–11 to conductor 41. The ground on this conductor notifies supervision, dial tone and system busy tone circuit 45 that the signal link has been seized by a calling station. Circuit 45 then applies system busy tone to conductor 42 for subsequent stations going off-hook to originate a call, and applies dial tone to conductor 41 for the calling station. The dial tone signal transmitted through the secondary winding of transformer T1 causes a signal to be induced in the primary windings and dial tone is transmitted over the tip and ring conductors to the calling party.

With contacts S1–3 closed the positive potential of source 16 is extended through these contacts and contacts H1–7 to conductor 24. The positive potential on this conductor enables gate 13. Dial pulses transmitted over tip and ring conductors 14 and 15 are extended through the gate to conductor 43. The dial pulses are registered in station selector 40. When the first pulse is received the dial tone signal on conductor 41 may be removed as described in the Barbato et al. application. Station selector 40 determines the identity of the called station and applies a positive potential to the respective one of conductors SS1 through SS20. The operation of the station selector is shown only symbolically in the drawing. Suppose the called station is station 20. The potential on conductor SS20 is applied to one end of the hold magnet H20. Although contacts H20–4 are closed the magnet does not operate because conductor 59 is not grounded. Similarly although the positive potential of source 16 is extended through contacts S1–3 to the winding of hold magnet H1, even though contacts H1–4 are closed the magnet is not energized because conductor 59 is not grounded. The two hold magnets are energized only when conductor 59 is grounded and current flows through the windings.

When station selector 40 pulses conductor SS20 it also pulses conductor 47. This latter pulse selects one of the two ringing links. Relay Y1 is energized whenever the first ringing link is in use, and relay Y2 is energized whenever the second ringing link is in use. The first ringing link is always selected if it is idle. The pulse on conductor 47 is extended through contacts Y1–1, the winding of select magnet L1 and contacts AD2–3 and AD1–3 to ground to operate select magnet L1, the select magnet for the first ringing link. On the other hand, if the first ringing link is already in use contacts Y1–1 are open and contacts Y1–2 are closed. If the second ringing link is available the pulse on conductor 47 is transmitted through contacts Y1–2 and Y2–1, the winding of select magnet L2, and contacts AD2–3 and AD1–3 to ground to operate select magnet L2. If magnet L1 operates contacts L1–1 close to ground conductor 59, and if magnet L2 operates contacts L2–1 close to ground the conductor. In either case with the grounding of conductor 59 hold magnets H1 and H20 energize to connect stations 1 and 20 to the selected ringing link. Suppose the first ringing link is available and select magnet L1 operates. With the energization of the two hold magnets the six crosspoints at the intersection of the first horizontal and the first vertical and the six crosspoints at the intersection of the 20th horizontal and the first vertical of the crossbar switch close. Although select magnet L1 releases with the termination of the pulse on conductor 47 the two hold magnets remain energized. Positive source 16 is still connected through contacts S1–3 to one end of the winding of hold magnet H1. The other end of this winding was initially connected through contacts H1–4 to conductor 59. With the energization of the hold magnet these contacts open. Before they open however contacts H1–3 close to connect the other end of the winding through crosspoint C20, conductor 1RL–4 and contacts AD1–4 to ground. Relay AD1 is de-energized when the first ringing link is first seized and consequently since contacts AD1–4 are closed hold magnet H1 remains energized. The potential of source 16 is also extended through contacts S1–3 to crosspoint C21, conductor 1RL–3 and the winding of relay R1 to ground. This connection is provided for two purposes. First, relay R1 is operated to control the application of the ringing signal to the called station. Second, the positive potential on conductor 1RL–3 maintains hold magnet H20 energized. It will be recalled that the energizing potential for hold magnet H20 is derived from the pulse on conductor SS20.

This pulse terminates soon after it is applied. However, once hold magnet H20 is energized crosspoint C50 is closed and the positive potential of conductor 1RL–3 is extended through the crosspoint to one end of the winding of hold magnet H20. The other end of the winding is connected through contacts H20–3 and crosspoint C51 to grounded conductor 1RL–4. Thus as long as station 1 remains off-hook to supply a positive potential to conductor 1RL–3 the hold magnet of the called station remains energized.

With both calling and called stations connected to the selected ringing link ringback and ringing signals are extended to the respective parties. With contacts R1–1 closed a ringing signal from ringing generator 54 is extended through capacitor 55, resistor 56, contacts R1–1, crosspoint C52, conductor 48 and contacts S20–9 to the ringer at station 20. Since the called station is still on-hook, relay S20 is unoperated and contacts S20–9 are closed. Although crosspoint C24 is closed, the calling party does not hear the ringing since contacts S1–9 are open. At the same time that ringing is extended to the called station a ringback tone is extended to the calling station. Answer detection, busy tone, and ringback circuit 52 applies ringback tone to conductor 1RL–2. This tone is extended through crosspoint C22, contacts H1–1, the secondary winding of transformer T1, the parallel combination of resistor 18 and capacitor 19, and contacts S1–1 to ground. The ringback signal induced in the primary windings of the transformer is extended to the calling station.

If the called station is busy, busy tone is applied to conductor 1RL–2 by circuit 52 to be extended to the calling station rather than ringback tone. Circuit 52 determines whether the called station is idle or busy in the following manner. Ground potential is extended through contacts S1–1, resistor 18, the secondary winding of transformer T1, contacts H1–1 and crosspoint C22 to conductor 1RL–2. However, if the called station is idle this conductor is at a positive potential rather than ground. If the called station is available relay S20 is unoperated and contacts S20–2 are closed. The positive potential of source 64 is extended through resistor 65, contacts S20–2, resistor 72, the secondary winding of transformer T20, contacts H20–1 and crosspoint C53 to conductor 1RL–2. The positive potential on the conductor notifies circuit 52 that the called station is available. Resistor 18 is provided for the first station in order that the positive potential extended to conductor 1RL–2 from source 64 not be shorted to ground through contacts S1–1. As long as the positive potential appears on conductor 1RL–2 circuit 52 is notified that the called station is available and has not yet answered the call. As long as the positive potential appears on the conductor ringback tone is applied to the conductor to be extended to the calling station. When the called station goes off-hook contacts S20–2 open and the potential of source 64 is no longer extended to conductor 1RL–2. Circuit 52 is thus notified that the called station has answered and that the two stations may be transferred to a talking link.

On the other hand suppose the called station is busy. In this case contacts S20–2 are initially open and instead contacts S20–1 are closed. Both station circuits 1 and 20 thus now extend ground potential to conductor 1RL–2. The conductor is at no time positive in potential and circuit 52 is thus notified that the called station is busy. Busy tone is applied by circuit 52 to the conductor rather than ringback tone. Ringback tone is provided only if the conductor first goes positive in potential. If busy tone is extended to the calling station, when the calling party goes on-hook contacts S1–3 open. These contacts extend the potential of source 16 to the winding of hold magnet H1. When the contacts open, the hold magnet releases and the respective crosspoints open to free the ringing link.

While the first ringing link is in use crosspoints C23 and C54 are closed. The ground potential on conductor 1RL–1 maintains relay Y1 operated in order that the next pulse from station selector 40 on conductor 47 cause the second ringing link, if it is idle, to be seized. The ground potential on conductor 1RL–1 is extended through circuit 52 to one input of gate 50. If the second ringing link is also in use, the other input to gate 50 is also grounded. AND gate 50 operates only when both inputs are at ground potential. In such a case the resulting signal on conductor 46 notifies supervision, dial tone, and system busy tone circuit 45 that both ringing links are in use. Circuit 45 operates the B relay to open contacts B–1 in order that no new calls be processed. Since both ringing links are busy a third calling party is prevented from seizing the signal link since after dialing the calling and called stations could not be transferred to a ringing link.

Crosspoint C55 is provided for the following purpose. It will be recalled that the calling party's relay S1 initially operated when the calling station went off-hook from the ground potential on conductor SL4. The relay thereafter locked to ground over contacts S1–4. When the signal link is first seized contacts B–1 open and consequently ground potential no longer appears on conductor SL4 to operate relay S20 when the called station goes off-hook. For this reason another connection to ground must be extended to relay S20. This connection should not be extended to the S relays of the other stations because the only S relay which should operate when a party goes off-hook is that of the called party. When crosspoint C55 closes the ground on conductor 1RL–5 is extended through contacts S20–5 to the winding of relay S20. This ground enables relay S20 to operate when the called station goes off-hook, the relay thereafter locking to ground over contacts S20–4.

When the called station answers, as described above, conductor 1RL–2 goes from a positive potential to ground. Circuit 52 controls the application of a positive potential to conductors 66 and 67. If contacts AD2–1 are closed the positive potential on conductor 66 causes relay AD1 to operate. The operation of this relay initiates the transfer of the calling and called stations to an idle talking link. Similarly, circuit 53 applies a positive potential through contacts AD1–1 to the winding of relay AD2 when a called station connected to the second ringing link answers the ringing. It is possible that the two called stations on two different calls will go off-hook at the same time. It is necessary that only one pair of stations be transferred to a talking link in any one operation. Suppose relay AD2 operates before relay AD1. In such a case since contacts AD2–1 open the positive potential on conductor 66 is not extended to the winding of relay AD1. Instead, the positive potential on conductor 67 is extended through contacts AD2–2 and delay D1 to the winding of relay AD1. Thus, the operation of relay AD1 is delayed, the delay being greater than the time required to transfer the stations on the second ringing link to a talking link. After this transfer operation relay AD1 operates to control the transfer of the stations on the first ringing link to a second talking link. In a similar manner contacts AD1–1 and AD1–2 and delay D2 are provided to delay the operation of relay AD2 if relay AD1 first operates.

When contacts AD1–3 open the windings of both select magnets L1 and L2 are disconnected from ground. This prevents the operation of select magnet L2 in the event circuit 40 applies a pulse to conductor 47. While the first ringing link is in use it is possible that a second calling station has seized the signal link and that the second called station has been prepared for connection to the second ringing link. It is necessary that the system not attempt to transfer the second pair of stations to the second ringing link a the same time that the first pair of stations is transferred from the first ringing link to a talking link. Were both transfers to take place simultaneously it is possible that all four stations would be connected in parallel to the same link. For this reason when relay AD1 operates, select magnet L2 is prevented from operating. Although a pulse may be applied to conductor 47 select magnet L2 cannot operate until after relay AD1 releases. Circuit 52 maintains relay AD1 operated for the maximum time interval required to transfer the stations on the first ringing link to a talking link. The pulse on conductor 47 has a duration greater than this time interval in order that magnet L2 operate after relay AD1 releases. In a similar manner contacts AD2–3 are provided to delay the operation of select magnet L1 until after the stations on the second ringing link are transferred to a talking link.

The operation of relay AD1 is preliminary to the actual transfer of the stations on the first ringing link to a talking link. Circuit 52, immediately after pulsing conductors 66 and 67, pulses conductor ST1. A pulse is transmitted through OR gate 51 to allotter 61. The allotter controls the selection of an available talking link and the transfer of the stations on the first ringing link to this talking link. In order to transfer stations 1 and 20 from the first ringing link to the selected talking link it is first necessary to release hold magnets H1 and H20. The only way to disconnect these stations from the ringing link is to release the hold magnets. When relay AD1 operates contacts AD1–4 open and ground potential is removed from conductor 1RL–4. This is the ground potential which holds both hold magnets operated and thus both magnets release. Select magnets S1 and S20 are still operated, these relays being locked over their respective –4 contacts.

Allotter 61 first applies a positive potential to conductor 62 to operate select magnet L3. If the first talking link is in use conductor 1TL–1 is grounded and the winding of magnet L3 is shorted to ground. Consequently, select magnet L3 does not operate. The allotter then applies a positive potential to conductor 63 to operate select magnet L4. If the second talking link is also in use, conductor 2TL–1 is grounded and select magnet L4 cannot operate. The allotter then pulses the select magnet of the third talking link. This process continues until an idle talking link is found. (If there are no idle talking links, it is best that the signal link be prevented from being seized by a ninth calling station. An AND gate may be provided having eight inputs 1TL–1 through 8TL–1. If all talking links are in use, all eight of these conductors are grounded and the gate operates. The output of the gate may be extended to circuit 45 to control the operation of the B relay. This additional circuit need not be provided if it is expected that all eight talking links will rarely be in use at the same time.) Suppose the second talking link is available. Since conductor 2TL–1 is not grounded the positive potential on conductor 63 not only controls the operation of select magnet L4 but in addition is extended back on conductor 2TL–1 to the allotter. The positive potential on conductor 2TL–1 notifies the allotter that a talking link has been seized and that the allotter should cease operating.

With th operation of select magnet L4 contacts L4–1 close. Ground potential is extended to conductor 59 to once again operate hold magnets H1 and H20. With the operation of the two hold magnets the two sets of crosspoints at the intersections of the first and twentieth horizontals with the fourth vertical operate. The pulse on conductor 63 soon terminates and since contacts L4–1 open it is necessary to provide another holding path for the two hold magnets. Conductor 2TL–1 is connected to ground through crosspoints C31 and C61. The ground potential on this conductor not only serves as a signal to the allotter in subsequent operations that the second talking link is busy, but in addition allows relay T2 to be operated from source 71. With relay T2 operated contacts T2–1 are closed and ground potential is extended to conductor 2TL–3. The ground potential is extended through crosspoint C63 and contacts H20–3 to the winding of hold magnet H20 to hold the magnet operated. In a similar manner the ground potential is extended through crosspoint C33 and contacts H1–3 to maintain hold magnet H1 energized. With crosspoints C32 and C62 operated the secondary windings of transformers T1 and T20 are both connected to conductor 2TL–2 through respective –1 contacts on the respective hold magnets. With the transformers thus being placed in parallel the calling and called stations may talk to one another. Capacitor 19 is in parallel with resistor 18 in order to short voice signals from across the resistor. Similarly, capacitor 70 is provided in parallel with resistor 72 for station 20 for the same purpose. The stations remain connected to the talking link until they both go on-hook. At this time relays S1 and S20 release and with the opening of contacts S1–3 and S20–3 hold magnets H1 and H20 release to open the respective crosspoints. With the removal of the ground on conductor 2TL–1 the talking link may be seized once again by allotter 61.

All stations are notified of the state of the system by lamp signals. Consider lamp 11. When station 1 is on-hook conductor 21 connects lamp 11 through contacts S1–6 and H1–5 to conductor SL3. This conductor is connected through contacts B–10 to source 68. If the signal link is idle contacts B–10 are open and lamp 11 is not energized. If the link is busy and contacts B–10 are closed, lamp 11 is energized to notify the party at station 1 that he must wait for service. If the lamp is off, the party at station 1 may seize the signal link by going off-hook. Once he is off-hook, contacts S1–7 close and lamp conductor 21 is now connected to conductor SL1. This conductor is connected directly to source 68 which again maintains lamp 11 on to indicate to the party at station 1 that he is off-hook. A flashing lamp signal is also provided to visually notify a called party that his station is being rung. When station 1 is being rung hold magnet H1 is operated but relay S1 is released. Lamp conductor 21 is extended through contacts S1–6 and H1–6 to conductor SL2 and the flashing source 69.

It is possible to expand a two-station call by bringing in a third station (or to expand a three-station call by bringing in a fourth, etc.). To initiate the conference call either station on the talking link operates his conference pushbutton 1PB–CONF or 20PB–CONF. The operation of a conferene pushbutton controls the transfer of the two stations from the talking link back to the signal link in order that the third station be brought in the conference. The conference pushbutton should not be operated if the signal link is in use since one or more other stations are connected to it. When the parties on a talking link wish to expand the call there is no visual indication that the signal link is busy if indeed it is. As long as a station is off-hook its lamp is on since the lamp conductor is connected through the respective –7 contacts on the S relay to conductor SL1 and source 68. This visual signal is the same as that indicating that the signal link is busy. Thus when one of the parties on the talking link operates his conference pushbutton to initiate a transfer to the signal link he must somehow be told that the signal link is busy. If the signal link is busy the parties are not transferred to the signal link. The parties do not receive dial tone and are thus notified that they must wait for service.

While stations 1 and 20 are connected to the second talking link conference conductor 22 is connected through contacts S1–8 and crosspoint C34 to conductor 2TL–4 and a similar connection is provided for the conference conductor of station 20. As long as pushbuttons 1PB–CONF and 20PB–CONF are unoperated the connections to conductor 2TL–4 have no effect. When one of the conference pushbuttons is operated however a ground potential is extended to conductor 2TL–4. If the signal link is busy contacts B–3 are open and the ground potential is not extended to the winding of relay T2. The two stations remain connected to the talking link. If the talking link is idle however contacts B–3 are closed and the ground potential extended to the winding of relay T2 causes this relay to release. When contacts T2–1 open ground potential is removed from conductor 2TL–3 and hold magnets H1 and H20 release. Since relays S1 and S20 are still operated the two stations are connected, in parallel, to the signal link in the ordinary manner. Each station extends a ground potential to conductor 41 to notify circuit 45 that the signal link has been seized. The B relay operates to prevent other stations from seizing the signal link. Dial tone is returned over conductor 41 to both stations in the ordinary manner, and one of the two stations dials the station number of the station to be brought in the conference. When dialing is completed and the winding of the hold magnet of the third station is pulsed the pulse on conductor 47 causes all three stations to be transferred to a ringing link. If the called station is available it receives a ringing signal and ring-back is sent to the two stations already off-hook. If the called station is busy the two stations already off-hook receive busy tone in the ordinary manner. The operation of the system is the same as that which ensues in the setting up of a two-party call except that the two calling stations receive the same signals. When the called station goes off-hook the three stations are transferred to a talking link in the ordinary manner.

In the setting up of a two-party call if the called station is busy the calling station goes on-hook to release the ringing link since the call may not be completed. However, if two parties attempt to expand a call and the third station is busy, the two original parties must be transferred to a talking link in order that they continue their conversation if that is desired. Either party on the ringing link may manually control the transfer of both stations from the ringing link to a talking link by operating his conference pushbutton. While any two stations are connected to the first ringing link, for example, conductor 1RL–6 is at the positive potential of source 57. With contacts R1–1 closed, conductor 1RL–6 is extended to the PB–CONF pushbuttons of the off-hook stations connected to the ringing link through the –8 contacts on the respective S relays, and to the ringer of the on-hook station connected to the ringing link through the –9 contacts on the respective S relays. It will be recalled that the ringing signal is applied to conductor 1RL–6 to be extended to the called station. The ringing signal is superimposed on the positive potential extended to the conductor from source 57 through resistor 56. If the called station does not answer following the ringing, or busy tone is extended over conductor 1RL–2 to the two calling stations to indicate that the called station is busy, one of the calling parties operates his conference pushbutton to apply a ground potential to conductor 1RL–6 through the –8 contacts on his respective S relay. When conductor 1RL–6 goes from a positive potential to ground, answer detection, busy tone and ringback circuit 52 is notified that the stations on the ringing link should be transferred to a talking link. The transition to ground potential on conductor 1RL–6 is treated the same way as is the transition from a positive potential to ground on conductor 1RL–2 if the called station goes off-hook. The only difference is that the ground potential is applied to conductor 1RL–2 automatically when the called party answers the ringing while it must be applied manually to conductor 1RL–6 by the operation by one of the calling stations of the respective conference pushbutton. Thus each conference pushbutton controls not only the transfer of stations already connected to a talking link to the signal link, but in addition the transfer of stations on a ringing link to a talking link if the called party is either busy or does not answer the ringing.

It is to be understood that the above-described embodiment is only illustrative of the principles of the invention. Numerous modifications may be made therein and other arrangements may be devised without departing from the spirit and scope of the invention.

What is claimed is:

1. An intercom system comprising a plurality of stations, a plurality of talking links, a signal link, a group of ringing links, means responsive to a calling station going off-hook for connecting said calling station to said signal link, means responsive to information received from said calling station for connecting to said signal link a called station, means responsive to the connection of said called station to said signal link for transferring said calling and called stations to one of said ringing links, means for supplying over said one ringing link a ringing signal to said called station and ringback signal to said calling station, and means responsive to said called station going off-hook for transferring said calling and called stations from said one ringing link to an idle one of said talking links.

2. An intercom system in accordance with claim 1 further including means for extending a busy tone signal over said one ringing link to said calling station if said called station is busy.

3. An intercom system in accordance with claim 1 further including a pushbutton at each of said stations, and means in each of said talking links responsive to the operation of the pushbutton at any station connected to the talking link for controlling the transfer of all stations connected to said talking link to said signal link.

4. An intercom system in accordance with claim 3 further including means responsive to the operation of the pushbutton at any station connected to a ringing link for controlling the transfer of all stations connected to said ringing link to an idle one of said talking links.

5. An intercom system comprising a crossbar switch having a plurality of horizontal conductor groups and first and second pluralities of vertical conductor groups, a plurality of stations each connected to a respective one of said horizontal conductor groups, control means connectable to all of said stations for selecting an off-hook calling station and an on-hook called station, means responsive to the operation of said control means for connecting the respective calling and called station horizontal conductor groups to one of the vertical conductor groups in said first vertical plurality, means connected to each vertical conductor group in said first plurality for extending a ringing signal to a connected called station conductor group and for extending a ringback signal to a connected calling station conductor group, and means responsive to said called station going off-hook for disconnecting the calling and called station horizontal conductor groups from said one vertical conductor group and for connecting the calling and called station horizontal conductor groups to one of the vertical conductor groups in said second vertical plurality.

6. An intercom system in accordance with claim 5 further including means for preventing the simultaneous disconnections of station conductor groups connected to respective ones of the vertical conductor groups in said first plurality.

7. An intercom system in accordance with claim 6 further including means for preventing the initial connection of station conductor groups to one of the vertical conductor groups in said first plurality simultaneously with the disconnection of station conductor groups connected to one of the vertical conductor groups in said first plurality.

8. An intercom system comprising a plurality of stations, a plurality of talking links, a signal link, a group of intermediate links, means responsive to a calling station going off-hook for connecting said calling station to said signal link, means responsive to station code information received on said signal link from said calling station for selecting a called station, means responsive to the selection of said called station for connecting said calling and called stations to one of said intermediate links, and means responsive to said called station going off-hook for transferring said calling and called stations from said one intermediate link to an idle one of said talking links.

9. An intercom system comprising a plurality of stations, a plurality of talking links, a group of intermediate links, signal link means initially connected to one of said stations for identifying said one and another of said stations, means for thereafter connecting said identified stations to an idle one of said intermediate links, and means for thereafter transferring the stations connected to said one intermediate link to an idle one of said talking links.

10. An intercom system in accordance with claim 9 wherein said signal link means includes means for connecting a station going off-hook to originate a service request to said signal link means and means responsive to station code information received from said off-hook station for preparing a path to connect a called station to said one intermediate link.

11. An intercom system in accordance with claim 10 wherein said one intermediate link includes means for extending a ringing signal to said called station.

12. An intercom system in accordance with claim 11 wherein each of said intermediate links includes means for preparing a path to connect the connected stations to said idle one of said talking links responsive to said called station going off-hook.

13. An intercom system in accordance with claim 12 wherein each of said talking links includes means for connecting said calling and said called stations to each other to enable voice communication until said calling and said called stations go on-hook.

14. A switching system comprising a plurality of stations, a plurality of communication links, a signal link, means including said signal link for identifying service requesting calling and idle called stations, means for thereafter providing ringing and ringback signals for said calling and called stations without the use of said signal link, and means responsive to said called station responding to said calling station for establishing a connection between said calling and called stations over one of said communication links.

References Cited

UNITED STATES PATENTS

| | | | |
|---|---|---|---|
| 2,390,203 | 12/1945 | Campbell | 179—37 |
| 2,883,457 | 4/1959 | Carter et al. | 179—1 |
| 3,342,944 | 9/1967 | Barbato et al. | 179—18 |

KATHLEEN H. CLAFFY, *Primary Examiner.*

D. L. STEWART, *Assistant Examiner.*